(12) United States Patent
Berger et al.

(10) Patent No.: US 10,936,866 B2
(45) Date of Patent: Mar. 2, 2021

(54) METHOD FOR DETECTING DOCUMENT FRAUD

(71) Applicant: IDEMIA IDENTITY & SECURITY FRANCE, Courbevoie (FR)

(72) Inventors: Thibault Berger, Courbevoie (FR); Laurent Rostaing, Courbevoie (FR); Alain Rouh, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 14 days.

(21) Appl. No.: 16/585,548

(22) Filed: Sep. 27, 2019

(65) Prior Publication Data

US 2020/0110932 A1    Apr. 9, 2020

(30) Foreign Application Priority Data

Oct. 9, 2018 (FR) ..................................... 18/59345

(51) Int. Cl.
*G06K 9/00* (2006.01)
*G06K 9/62* (2006.01)

(52) U.S. Cl.
CPC ....... *G06K 9/00577* (2013.01); *G06K 9/6215* (2013.01); *G06K 9/6298* (2013.01); *G06K 2009/6213* (2013.01)

(58) Field of Classification Search
None
See application file for complete search history.

(56) References Cited

U.S. PATENT DOCUMENTS

| 8,238,614 | B2* | 8/2012 | Konishi | G06K 9/00463 382/112 |
|---|---|---|---|---|
| 2009/0080783 | A1* | 3/2009 | Hirohata | G06K 9/00577 382/218 |
| 2011/0122452 | A1* | 5/2011 | Zhao | H04L 9/3226 358/3.28 |
| 2012/0324534 | A1 | 12/2012 | Mandridake et al. | |
| 2015/0206372 | A1 | 7/2015 | Zhu et al. | |

(Continued)

OTHER PUBLICATIONS

Jul. 11, 2019 Search Report issued in French Patent Application No. 1859345.

(Continued)

*Primary Examiner* — Fayyaz Alam
(74) *Attorney, Agent, or Firm* — Oliff PLC; R. Brian Drozd

(57) ABSTRACT

A method for detecting a document fraud is disclosed. A first image of a first document and a second image of a second document are obtained. A procedure of detection of zones sensitive to document frauds are applied in the regions of the first image and of the second image registered on the first image. Each sensitive zone detected is then divided into a plurality of subparts. A measurement of dissimilarity is calculated between corresponding subparts from the first image and the registered second image. It is then determined whether the first document is identical to the second document from measurements of dissimilarity. If the first document is different from the second document, a level of difference is determined between the first and second documents according to a value representing a proportion of different subparts; and a fraud is detected when the level of difference is below a third predetermined threshold.

14 Claims, 8 Drawing Sheets

(56) References Cited

U.S. PATENT DOCUMENTS

2016/0210621 A1* 7/2016 Khan .................. G06Q 20/409
2018/0285639 A1 10/2018 Dura et al.
2019/0180094 A1* 6/2019 Zagaynov ............ G06K 9/6256

OTHER PUBLICATIONS

Gariup et al; "Document Fraud Detecion at the Border Preliminary observations on human and machine performance;" European Intelligence and Security Informatics Conference; pp. 231-238; 2013.

* cited by examiner

METHOD FOR DETECTING DOCUMENT FRAUD

The invention relates to a method for detecting an attempt at document fraud, and a device implementing said method.

Many fraudulent methods are based on a use of falsified documents. This is the case for example with intrusion methods based on falsified identity documents. This is also the case with frauds consisting of opening multiple bank accounts in online banks offering bonuses when accounts are opened. The detection of document frauds is therefore an important challenge in terms of security, but also in economic terms.

Some document fraud techniques consist of locally modifying an original document in order to produce a new document. For example, these techniques may consist of replacing a photograph in a document or modifying at least one letter or figure in a text area of said document. The document obtained is very similar to the original document but contains sufficient differences locally to defraud.

Techniques exist for preventing such frauds. Some are based on an insertion in the documents of security patterns or unfalsifiable information such as biometric information in passports, this biometric information being encoded in an electronic chip of some passports. However, these techniques require either having physical access to the document or using a specific imaging system making it possible typically to produce images in a near infrared spectrum or in ultraviolet fluorescence, which is not possible for online procedures where a user uses for example a smartphone in order to transmit only one or more colour images of his documents.

One known solution consists of carrying out a classification of a digitised version of a document in order to know the type thereof (identity card, car registration document, driving license, passport). Once the document is classified, high-level information is extracted such as text fields (also referred to as OCR (optical character recognition) fields from the name of a technique used for automatically extracting characters from a document) or information representing a face contained in the document. Prior classification facilitates the extraction of relevant information for fraud detection. It is known in fact where to seek this information in the digitised document. In general, these solutions have the drawback of being specific to the document being studied and are sensitive to algorithm errors in extraction of the high-level information.

The document "*Document fraud detection at the border: Preliminary observations on human and machine performance*, M. Gariup, G. Soederlind, *Proc. Europ. Intelligence and Security Informatics Conference (EISIC)*, pp. 231-238, August 2013"» presents a fairly broad outline of approaches for detecting document fraud in the case of border control. The automatic methods proposed in this document are based mainly on an analysis of specific security patterns as well as on the formation of a reference document base, which is often a weak point.

Another approach consists of calculating a digital signature of an image of the document and saving it. This saved signature can then be used subsequently in order to authenticate another image of this same document. This approach, which is found in the patent document FR 3047688, requires an enrolment of each document in order to calculate its reference signature. This approach cannot therefore be used if this enrolment and a suitable infrastructure for managing the signatures are not available. The use of signatures makes it possible to determine whether two documents are identical or different but does not make it possible to determine whether the differences are due to a fraud.

It is desirable to overcome these drawbacks of the prior art.

It is in particular desirable to propose a method making it possible, without prior knowledge of characteristics of the documents and without any prerequisite with regard to the digitisation of said documents, to determine whether a first document is the result of one or more local modifications of a second document, which would represent an attempt at document fraud.

According to a first aspect of the invention, the invention relates to a method for detecting document fraud, comprising: obtaining a first image of a first document and a second image of a second document; applying an image registration procedure to the second image so as to register it to the first image, the registration procedure being based on a matching of points of interest identified in the first and second images; applying a procedure of detection of zones sensitive to document frauds in the first image and in the registered second image; dividing each sensitive zone detected into a plurality of subparts and, for each subpart, calculating a signature representing a content of said subpart; for each subpart of the first image, seeking a subpart corresponding spatially in the registered second image and, for each subpart of the first image having a corresponding subpart in the second image, calculating a measurement of local dissimilarity between the corresponding subparts from the signatures; determining that the first and second documents are identical when a measurement of global dissimilarity determined from a distribution of probabilities of measurements of local dissimilarities is below a first predetermined threshold and, when the first document is different from the second document; determining a level of difference between the first and second documents according to a value representing a proportion of pixels in the first image situated in sensitive zones belonging to a subpart having a corresponding subpart in the second image where the measurement of dissimilarity is higher than a second predetermined threshold; and detecting a fraud when the level of difference is below a third predetermined threshold.

The method of the invention is completely generic since it requires no a priori knowledge about the documents analysed, about the devices that acquired the images of the document, about the angle of photographing of the documents and about the illumination of the documents at the moment of photographing.

According to one embodiment, the registration procedure comprises: determining that no fraud has been detected when a value representing an efficacy of matching of points of interest between the first and second images is below a predetermined threshold.

Thus the registration method makes it possible to reject documents of different types.

According to one embodiment, the sensitive zone detection procedure comprises a procedure for detecting a face in the first image and the registered second image and/or a procedure for detecting text zones in the first image and the registered second image.

According to one embodiment, the measurement of global dissimilarity is such that an integral of a probability distribution of the measurements of local dissimilarity between the first image and the registered second image, said integral being calculated between the measurement of global dissimilarity and a maximum value of the measurements of local dissimilarity in said distribution, is higher than a predetermined fourth threshold, said predetermined fourth threshold being equal to a predetermined second percentage of an integral of the probability distribution of the local dissimilarity measurements.

According to one embodiment, in order to determine a difference level between the first and second documents, the method comprises: comparing the measurement of dissimilarity of each subpart of the first image matched with a subpart of the second image with the predetermined second threshold and classifying the pixels of an image, referred to as an intermediate image, taken from the first or second images, belonging to subparts for which the dissimilarity measurement is higher than the predetermined second threshold in a class of pixels considered to be dissimilar; forming dissimilar pixel regions from pixels classified in the class of pixels considered to be dissimilar; calculating a sum of the areas of the dissimilar pixel regions and obtaining an indicator of dissimilarity representing said difference level by dividing this sum by a sum of the areas of the sensitive zones.

According to one embodiment, each sum is a weighted sum, each area being weighted with a predetermined weight dependent on an importance attributed to the dissimilar pixel region or to the sensitive zone corresponding to the area calculated.

According to one embodiment, the importance attributed to the dissimilar-pixel region or to a sensitive zone is predefined according to a type of content of the zone.

According to one embodiment, the dissimilar-pixel regions wherein a dimension is smaller than a predetermined dimension are not taken into account in calculating the sum of the areas of the dissimilar-pixel regions.

According to one embodiment, the method comprises: applying a segmentation procedure to the first and second images, said segmentation procedure making it possible to detect quadrilaterals in an image, each quadrilateral found in an image being considered to form part of the document contained in said image, the image registration procedure and the sensitive zone detection procedure being carried out in the quadrilaterals identified by the segmentation procedure.

According to one embodiment, the detection of zones sensitive to document frauds in the first image and in the registered second image is executed in portions of the first image and of the registered second image comprising points of interest matched.

According to one embodiment, each sensitive zone is a rectangle and is divided (55) in a regular tiling, each subpart being a rectangle a length of which is a third predefined percentage of a length of the rectangle representing the sensitive zone detected in which the subpart is situated and a width of which is a predefined fourth percentage of a width of said rectangle.

According to a second aspect of the invention, the invention relates to a device for detecting a document fraud comprising: obtaining means for obtaining a first image of a first document and a second image of a second document; processing means for applying an image registration procedure to the second image in order to register it to a first image, the registration procedure being based on a matching of points of interest identified in the first and second images; processing means for applying a procedure for detecting zones sensitive to document frauds in the first image and in the registered second image; processing means for dividing each sensitive zone detected into a plurality of subparts and, for each subpart, for calculating a signature representing a content of said subpart; searching means for seeking, for each subpart of the first image, a subpart corresponding spatially in the registered second image, and, for each subpart of the first image having a corresponding subpart in the second image, calculation means for calculating a measurement of local dissimilarity between the corresponding subparts from the signatures; determination means for determining that the first and second documents are identical when a global dissimilarity measurement determined from a distribution of probabilities of the local dissimilarity measurements is below a predetermined first threshold; determination means for determining, when the first document is different from the second document, a difference level between the first and second documents according to a value representing a proportion of pixels in the first image situated in sensitive zones belonging to a subpart having a corresponding subpart in the second image where the dissimilarity measurement is above a predetermined second threshold; and detection means for detecting a fraud when the difference level is below a predetermined third threshold.

According to a third aspect of the invention, the invention relates to a computer program comprising instructions for the implementation, by a device, of the method according to the first aspect, when said program is executed by a processor of said device.

According to a fourth aspect of the invention, the invention relates to storage means storing a computer program comprising instructions for the implementation, by a device, of the method according to the first aspect, when said program is executed by a processor of said device.

The features of the invention mentioned above, as well as others, will emerge more clearly from a reading of the following description of an example embodiment, said description being given in relation to the accompanying drawings, among which:

Figure 7:
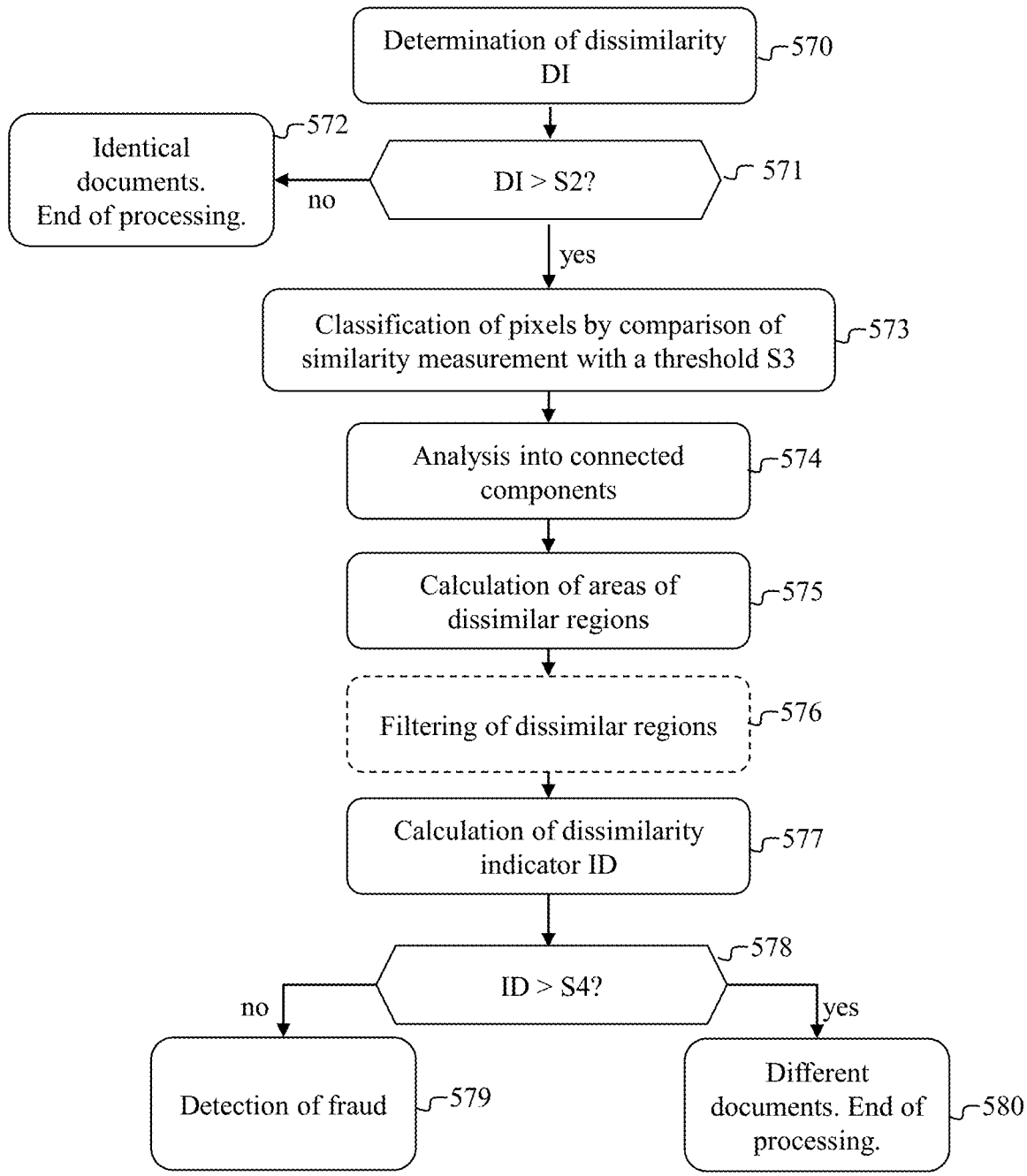
Figure 8:
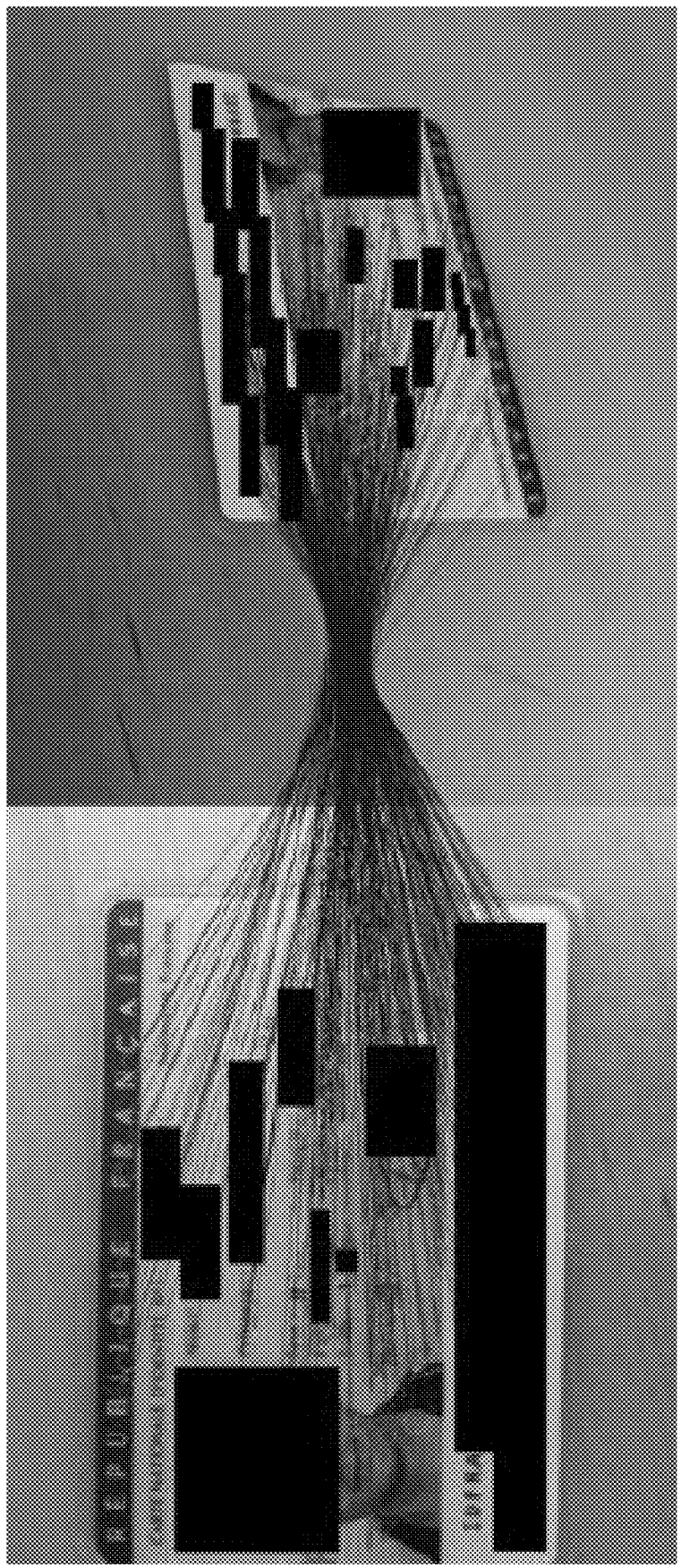
Figure 9:
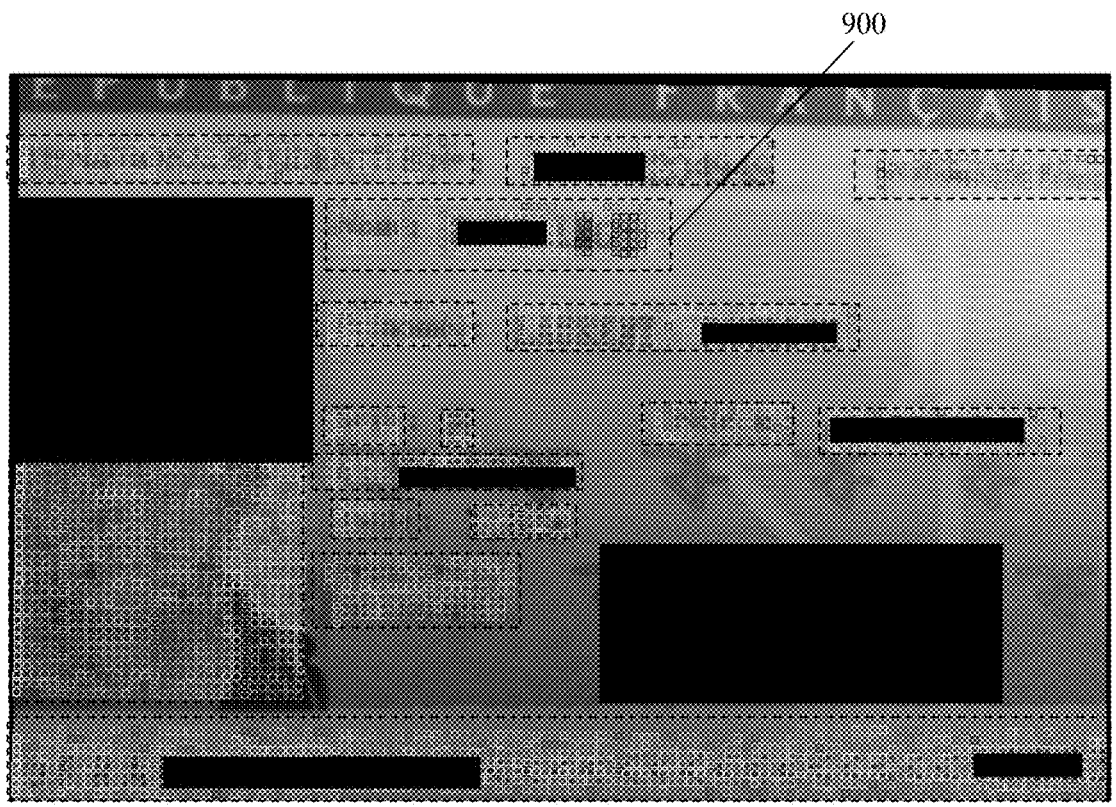
Figure 10:
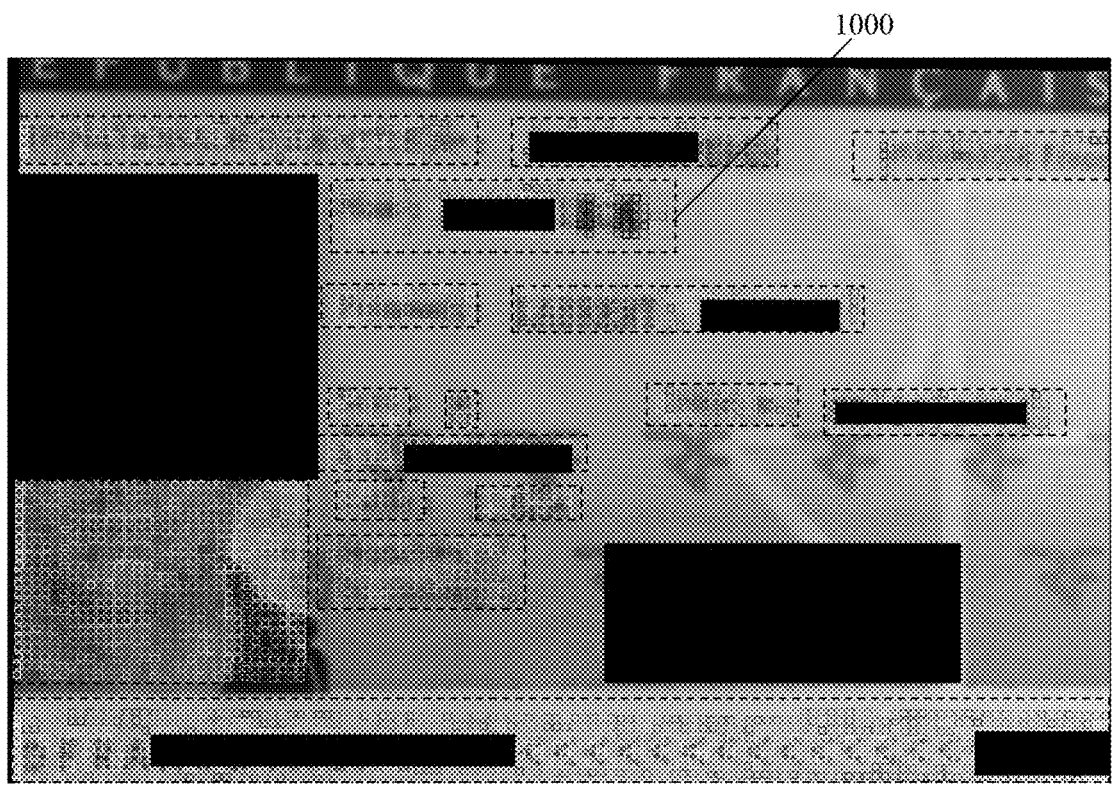

FIG. 7 describes schematically an example of a method for determining whether two images correspond to the same document, to identical documents or to the same document but with a fraudulent alteration;

FIG. 8 illustrates a matching of points of interest identified in a first and second image; and FIGS. 9 and 10 illustrate schematically a result of the division into subparts of sensitive zones detected respectively in a first image and in a second image registered to the first image.

The invention is described hereinafter in a context where the falsified document is an identity card. The invention is however suited to other types of documents such as driving licenses, car registration documents, passports, etc. Moreover, the invention is implemented by a device such as a computer obtaining documents by means of a communication network. The invention may however be implemented by other devices and in particular devices having image acquisition capabilities such as a smartphone or a tablet. In addition, the invention is applied to images of documents that may represent documents seen in front view or in perspective view. The perspective view of a document shows a deformed document. An initially rectangular document may then become any quadrilateral. However, the invention may also apply to documents that have undergone more complex deformations, such as documents that are folded, crumpled, non-planar, etc.

Figure 1:
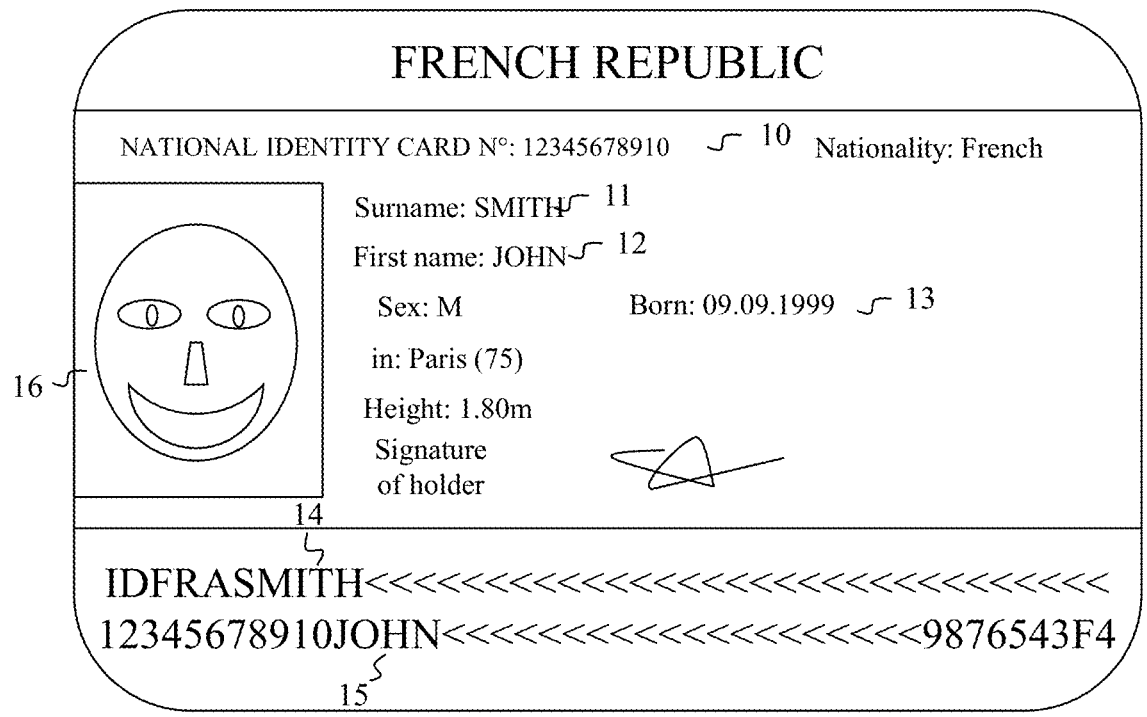
FIG. 1 illustrates schematically an example of a document.

FIG. 1 illustrates schematically an example of a document.

The document in FIG. 1 is an identity card shown schematically, comprising a plurality of text fields such as a field 10 comprising a number, a field 11 comprising a surname, a field 12 comprising a first name, a field 13 comprising a date of birth, and fields 14 and 15 repeating information contained in fields 10 to 13 and in particular the surname, first name and number. All these fields are personalisable since they are dependent on the owner of the identity card.

Figure 2A:
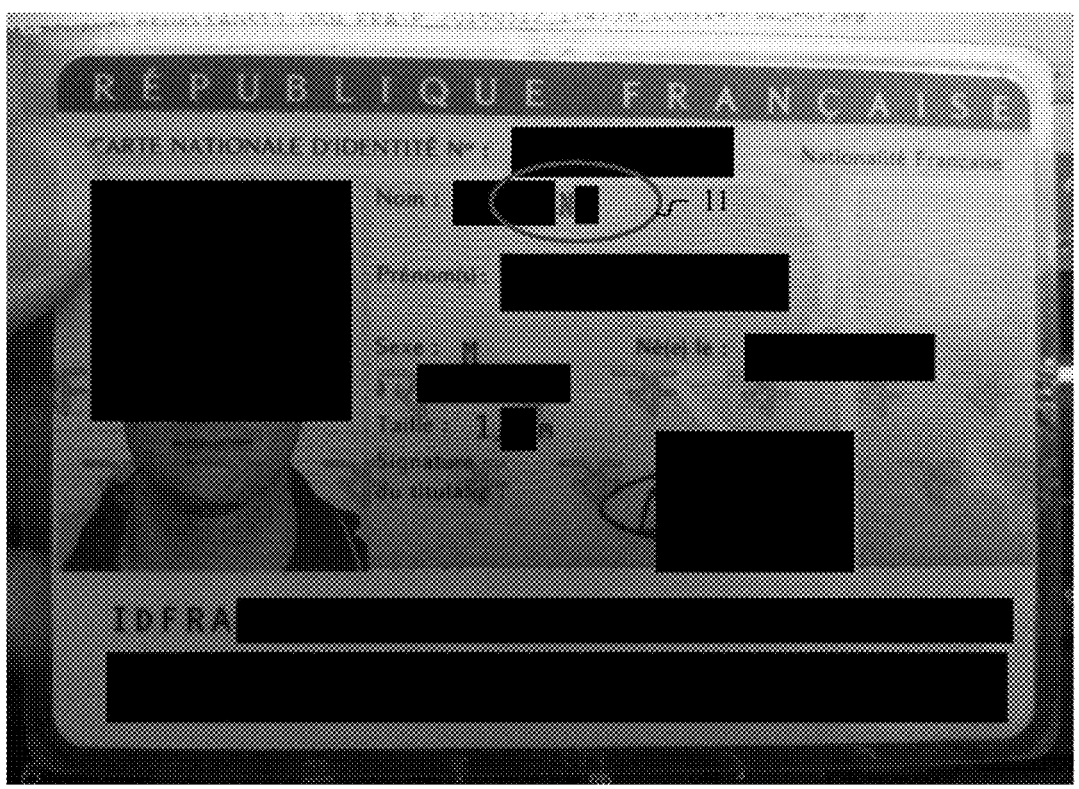
FIG. 2A illustrates an image of a first document and FIG. 2B illustrates an image of a second document, the second document resulting from a falsification of the first document.
Figure 2B:

FIG. 2A illustrates an image of a first document and FIG. 2B illustrates an image of a second document, the second document resulting from a falsification of the first document.

Figure 4:
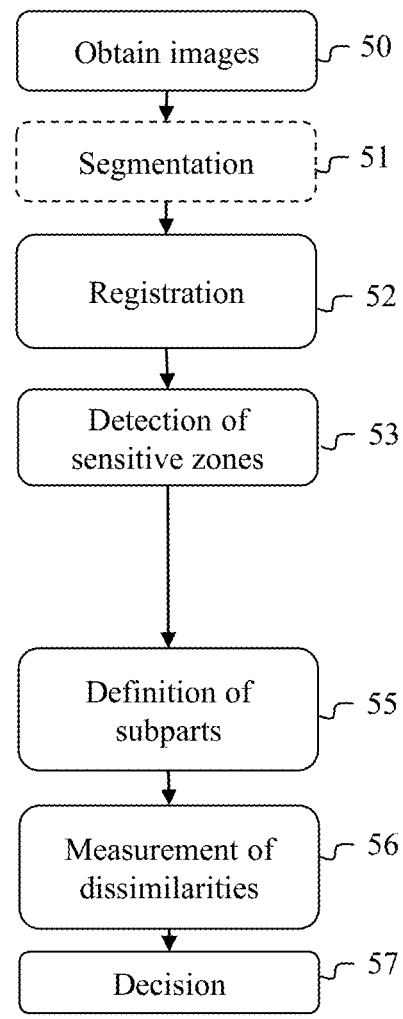
FIG. 4 illustrates schematically a method for determining that a document results from a falsification of another document.

The documents of FIGS. 2A and 2B are identity cards. FIGS. 2A and 2B depict real documents and, for reasons of confidentiality, black masks have been placed on the fields of the documents that might make it possible to recognise the owner of the documents. However, all the processing operations applied to images described hereinafter, in particular in relation to FIG. 4, are applied to each image entirely, without taking into account the black masks. The field 11 can be seen in the first and second documents. As may be realised, in the case of the second document, the document fraud consisted of modifying the field 11. Thus, in the field 11, the letter "N", was replaced by the letter "S" and a letter "A" was added at the end of the field 11.

Figure 3A:
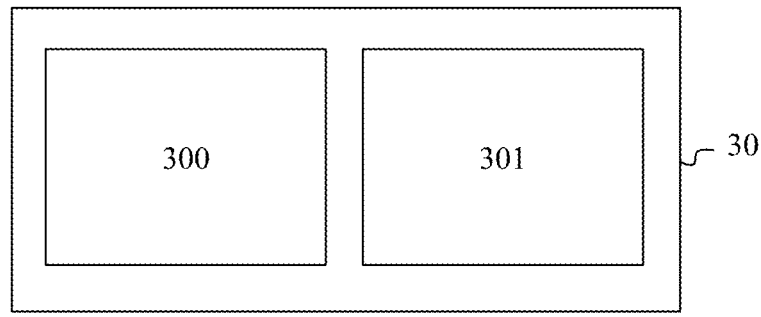
FIG. 3A illustrates schematically a device implementing the invention.

FIG. 3A illustrates schematically a device implementing the invention.

The device 30 in FIG. 3A comprises a processing module 300 and a display module 301 such as a screen. The display module 301 displays messages intended for users indicating whether an attempt at document fraud has been detected. In one embodiment, the display module 301 displays the images analysed but no information on detection of an attempt at fraud in order not to give any indications to a user on the fraud detection method used. On the other hand, the fraud detection information is transmitted by the device 30 to a central system, not shown, so that action is taken.

Figure 3B:
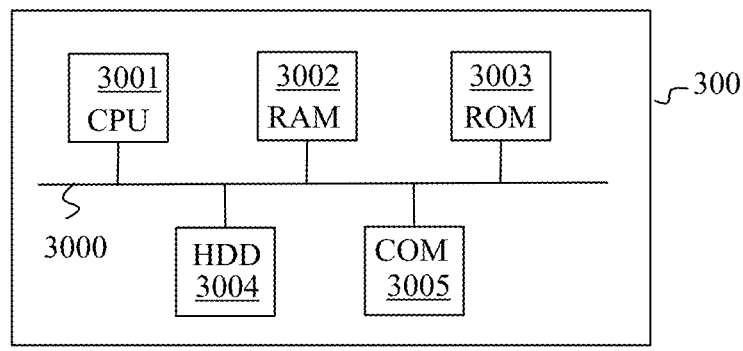
FIG. 3B illustrates schematically an example of hardware architecture of a processing module used for implementing the invention.

FIG. 3B illustrates schematically an example of hardware architecture of the processing module 300 used for implementing the invention.

According to the example of hardware architecture depicted in FIG. 3B, the processing module 300 then comprises, connected by a communication bus 3000: a processor or CPU (central processing unit) 3000; a random access memory RAM 3002; a read only memory ROM 3003; a storage unit such as a hard disk or a storage medium reader, such as an SD (secure digital) card reader 3004; at least one communication interface 3005. The communication interface 3005 enables the processing module 300 to receive images for which it must determine whether there has been an attempt at fraud, for example from a communication network. Each image may for example be transmitted to the processing module 300 by an image acquisition device such as a photographic apparatus, a camera or a smartphone.

The processor 3001 is capable of executing instructions loaded into the RAM 3002 from the ROM 3003, from an external memory (not shown), from a storage medium (such as an SD card), or from a communication network. When the processing module 3000 is powered up, the processor 3001 is capable of reading instructions from the RAM 3002 and executing them. These instructions form a computer program causing the implementation, by the processor 3001, of all or some of the methods described below in relation to FIG. 4.

The method described below in relation to FIG. 4 can be implemented in software form by the execution of a set of instructions by a programmable machine, for example a DSP (digital signal processor), a microcontroller or a GPU (graphics processing unit), or be implemented in hardware form by a machine or a dedicated component, for example a FPGA (field-programmable gate array) or an ASIC (application-specific integrated circuit).

FIG. 4 illustrates schematically a method for determining that a document results from a falsification of another document.

In a step 50, the processing module 300 obtains a first image of a first document and a second image of a second document. The first and second documents may be documents of the same type (for example two identity cards) or of different types (for example an identity card and a passport). The first and second images were able to be acquired with different or identical image acquisition devices, according to different or identical viewing points and with different or identical illumination conditions. For example, the first document is the document in FIG. 2A and the second document is the document in FIG. 2B.

It is assumed hereinafter that each document to which this invention relates is initially rectangular in shape, which is the case with official documents. Moreover, although the invention is suited to documents that have undergone more complex deformations, such as folded, crimpled or non-planar documents, in order to simplify the description we deal in the remainder of the description mainly with deformation due to differences in viewing points. An image of a rectangle taken from any point of view is a quadrilateral.

In a step 52, the processing module 300 applies an image registration procedure to the second image in order to register it to the first image, the registration procedure being based on a matching of points of interest identified in the first and second images.

Figure 5:
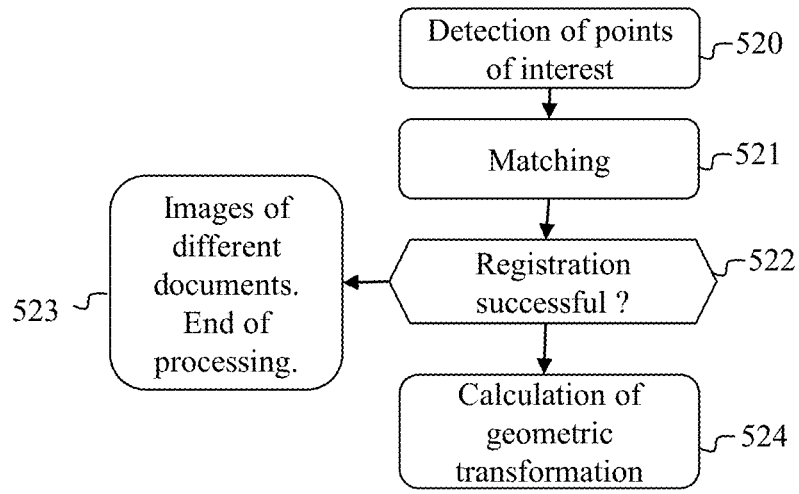
FIG. 5 illustrates schematically an example of an image registration procedure.

FIG. 5 illustrates schematically an example of an image registration procedure.

In a step 520, the processing module 300 applies a method for seeking points of interest to the first and second images. The method for seeking points of interest is for example a method described in the article "*SURF: Speeded Up Robust Features*, Bay, Tuytelaars, Van Gool, 2006" or the method described in the article "*SUSurE: Speeded Up Surround Extrema Feature Detector and Descriptor for realtime time applications*, Ebrahimi, Cuevas, 2008". Applying the method for seeking points of interest makes it possible to obtain a list of points of interest for the first and second images, each point of interest of an image being identified by two-dimensional coordinates in the image and by a local descriptor of the content of the image.

In a step 521, the processing module 300 applies a matching method for the points of interest in the first and second images. It is a case here of matching points of interest in the first image with points of interest in the second image. Thus, for each point of interest in the first image, the processing module 300 seeks a corresponding point of interest in the second image. The points of interest are matched for example by measuring correlation between the immediate vicinities of the points of interest for which it is wished to determine a match. The vicinity of a point of interest is in general defined in the form a window of pixels of predefined size around the point of interest. For example, in one embodiment, the matching method used is a square window with sides of five pixels. There exist various correlation measurements. In one embodiment, the matching method uses a correlation measurement of the NCC ("normalised cross correlation") type used in the article "*Wide-Baseline Multiple-View Correspondences*, V. Ferrari et al., *IEEE Conference Proceedings of Computer Vision and Pattern Recognition, CVPR*, Vol. 2, Pages 718-725, Madison, USA, June 2003" or of the ZNCC ("zero-mean normalised cross-correlation") type used for example in the article "C. Sun, *A Fast Matching Method, Proc. of Digital Image Computing Techniques and Applications, DICTA*, Pages 95-100, Auckland, New Zealand, December 1997". When a point of interest in the first image has a plurality of corresponding points in the second image, the processing module 300 chooses the point of interest in the second image offering the highest measurement of correlation with the point of interest in the first image.

Other more sophisticated methods for matching points of interest may be used. Mention can be made for this purpose of the methods based on calculations of local descriptors and matching by stochastic algorithms such as RANSAC ("RANdom SAmple Consensus") that appeared in the document by Martin A. Fischler and Robert C. Bolles, "*Random Sample Consensus: A Paradigm for Model Fitting with Applications to Image Analysis and Automated Cartography*", Comm. of the ACM, vol. 24, June 1, p. 381-395". A method described in the document "Lowe D. G., 1999, *Object recognition from local scale invariant features, Proceedings of the International Conference on Computer Vision*, vol. 2, p. 1150-1157" may also advantageously be applied.

FIG. 8 illustrates a matching of points of interest identified in first and second images.

The image on the left in FIG. 8 corresponds to an image of the first document of FIG. 2A taken in front view. The right-hand image in FIG. 8 corresponds to an image of the second document of FIG. 2B taken in perspective. The second document appears deformed. It is no longer a rectangle but a quadrilateral. In FIG. 8, straight lines connect the points of interest detected in the first document to the points of interest detected in the second document. It is then realised that a large number of points of interest in the first document found a match in the second document, which is logical since the two documents are of the same type and in addition the second document results from a falsification of the first document.

In a step 522, the processing module 300 checks whether the execution of the matching method makes it possible to consider that the two documents are at least similar. To do this, for example, the processing module 300 determines whether a value representing an efficacy of matching points of interest between the first and second images is below a predetermined threshold. For example, if a percentage p of points of interest in the first image for which a corresponding point of interest has been found in the second image is below a predetermined percentage P. In one embodiment, P=80%.

If p<P, the processing module 300 considers that the first document does not correspond to the second document. In this case, the processing module ends the method of FIG. 4 and displays on the display module 301 a message indicating that no fraud has been detected.

The image registration procedure therefore makes it possible to reject documents of different types.

If p≥P, then during a step 524 the processing module calculates a transformation for registering the second image to the first image, i.e. making it possible to register the points of interest in the second image to the corresponding points of interest in the first image. To do this, the processing module 300 calculates a model of geometric deformation of the second document with respect to the first document. A first geometric deformation model may be:

an affine model determining an affine application connecting points of interest in the second document to the points of interest in the first document, such as a translation, a rotation or a homothetic transformation;
a homographic model determining a homographic application connecting the points of interest in the second document to the points of interest in the first document;
an interpolation model determined by means of an inverse distance weighting algorithm, as proposed in the document "Scattered data interpolation tests of some methods, Franke R, Mathematics of Computation, 38(157), 182-200, 1982" and/or spline interpolation.

In one embodiment, the processing module calculates a combination of various models with local estimation of deformation models. The use of such a combination of models makes it possible to model more complex deformations than with a single model.

In one embodiment, following the calculation of the geometric deformation model or models, each model calculated is applied to the second image. Then a registered second image is obtained, in which the second document is registered to the first document.

In a step 53, the processing module 300 applies a sensitive-zone detection procedure to document frauds in the first image and in the registered second image. In the context of the invention, the sensitive zones have a varied generic definition since there are zones of a real document that a fraudster would have an interest in modifying. The type of document analysed by the method of the invention is never taken into account in the definition of the sensitive zones. In this context, it can be considered that, in a document, there exist two types of zone sensitive to document frauds:

the zones comprising a face image (i.e. typically an image representing an identity photograph);
the zones comprising text.

Figure 6:
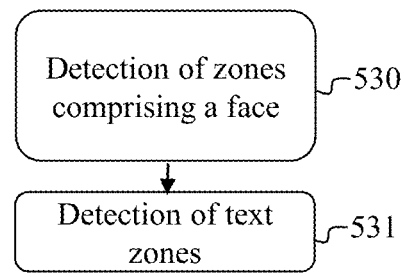
FIG. 6 illustrates in detail a method for detecting zones sensitive to document frauds.

FIG. 6 illustrates in detail a procedure for detecting zones sensitive to document frauds.

The procedure described in relation to FIG. 6 corresponds to step 53.

In a step 530, the processing module executes a procedure for detecting a face in the first image and the registered second image. The processing module 300 for this purpose applies for example the method described in the document "*Eigenfaces for Face Detection/Recognition*, M. Turk and A. Pentland, "*Eigenfaces for Recognition*", *Journal of Cognitive Neuroscience*, Vol. 3, No. 1, pp. 71-86, 1991" or the method described in the document "*Face detection system on adaboost algorithm using Haar Classifiers*, M. Gopi Krishna, A. Srinivasulu, *International Journal of Modern Engineering Research (IJMER)*, Vol. 2, Issue 5, September-October 2012, pp-3556-3560". If the document included in an image comprises a face photograph, step 530 makes it possible to obtain coordinates of at least one quadrilateral corresponding to a sensitive zone in which a face is situated.

In a step 531, the processing module 300 applies a procedure for detecting text zones in the first image and the registered second image. The processing module 300 for this purpose applies for example one of the methods described in the document "*Review on Text String Detection from Natural Scenes, International Journal of Engineering and Innovative Technology (IJEIT)*, vol. 2, Issue 4, October 2012" or the method described in the document "*Extraction and Recognition of Artificial Text in Multimedia Documents*, C. Wolf J. M. Jolion, *Formal Pattern Analysis & Applications*, February 2004, Vol. 6, Issue 4, pp 309-326". Step 531 makes it possible to obtain coordinates of at least one quadrilateral corresponding to a sensitive zone in which a text is situated.

Returning to FIG. 4, in a step 55, the processing module 300 divides each detected sensitive zone of each image into a plurality of subparts and, for each subpart, calculates a signature representing a content of said subpart. In one embodiment, each quadrilateral corresponding to a sensitive zone detected is a rectangle and each rectangle is divided in regular tiling. For example, each subpart is a rectangle the length of which is a predefined percentage pl of the length of the rectangle representing the sensitive zone detected in which the subpart is situated and the width of which is a predefined percentage pL of the width of said rectangle. In one embodiment, the predefined percentages pl and pL are between 10% and 33%.

In one embodiment, the signature calculated for each subpart is a histogram of oriented gradients (HOG). This type of signature is particularly suitable for textured elements such as faces, as shown by the document "*Histograms of Oriented Gradients for Human Detection*, N. Dalal and B. Triggs, 2005, *IEEE Computer Society Conference on Computer Vision and Pattern Recognition (CVPR'05)*". Other types of signature may however be used, such as the LPB (local binary patterns) descriptors described in the document "*Local Binary Patterns and its Application to Facial Image Analysis: A Survey*, D. Huang et al, *IEEE Transactions on Systems Man and Cybernetics Part C (Applications and Reviews)* 41(6): 765-781, November 2011". With regard to text zones, a text peak orientation histogram or a Fourier descriptor may also advantageously be used.

In a step 56, the processing module 300 seeks, for each subpart of the first image, a subpart corresponding spatially in the registered second image. For each subpart of the first image having a corresponding subpart in the registered second image, the processing module calculates a measurement of dissimilarity, referred to as the local dissimilarity measurement, between the corresponding subparts from signatures of the corresponding subparts. When, for example, the signature is a histogram of oriented gradients, the measurement of local dissimilarity of a subpart of the first image with a subpart of the registered second image is a difference between the histograms of oriented gradients of each subpart. A histogram of oriented gradients comprises, for each orientation in a plurality of predefined gradient orientations, a value, referred to as the statistical value, representing a number of pixels for which a gradient calculated at the position of these pixels follows said orientation. A difference between two histograms of oriented gradients is obtained for example by calculating, for each orientation appearing in the two histograms, a difference between the statistic values corresponding to this orientation and then calculating the sum of the absolute values of the differences calculated for each orientation.

FIGS. 9 and 10 illustrate schematically a result of the division into subparts of sensitive zones detected respectively in the first image and in the registered second image.

The sensitive zones are depicted in the form of rectangles in hatched lines. As can be seen in FIGS. 9 and 10, the same sensitive zones are found substantially in the first image and in the registered second image. Each sensitive zone is divided into square-shaped subparts. Depending on the local dissimilarity measurement calculated for each subpart following the matching of the subparts of the first image with the subparts of the registered second image, the circumference of each subpart appears dark to a greater or lesser extent. A subpart that is very dissimilar to a subpart with which it has been matched appears darker than a subpart that is very similar to the subpart with which it was matched. It should be noted that a great majority of subparts have a light circumference. It will be noted however that the sensitive zones 900 and 1000 comprise very dark subparts. These very dark subparts correspond to the letter "N" of the first document that was replaced by the letter S in the second document and the letter A that was added.

In one embodiment, during step 56 the processing module 300 applies a transformation in the form of a Gaussian pyramid to the first image and to the registered second image. For each image, each sensitive zone detected appears in each stage of the Gaussian pyramid resulting from the transformation. The division of each sensitive zone detected into a plurality of subparts and, for each subpart, the calculation of a signature representing a content of said subpart then take place in each stage of the Gaussian pyramid. A multiscale analysis of the first image and of the registered second image is then obtained.

In a step 57, the processing module 300 determines whether the first and second documents represent a fraud from the local dissimilarity measurements calculated.

FIG. 7 illustrates schematically an example of a method for determining whether two images correspond to the same document, to identical documents or to the same document but with a fraudulent alteration, corresponding to step 57.

In a step 570, the processing module 300 determines a measurement of dissimilarity DI such that an integral of a probability distribution of the measurements of dissimilarity between the first image and the registered second image, said integral being calculated between the measurement of dissimilarity DI and a maximum value of the measurements of dissimilarity in said distribution, is above a predetermined threshold S1. For example, S1 is equal to 5% of an integral of the probability distribution of the dissimilarity measurements. The dissimilarity measurement DI may be considered to be a global dissimilarity measurement representing dissimilarity between the document of the first image and the document of the second image.

In a step 571, the processing module 300 compares the dissimilarity measurement DI with a predetermined threshold S2.

The first document is considered to be identical to the second document when the dissimilarity measurement DI is below the predetermined threshold S2.

The predetermined threshold S2 is determined by learning using an image base comprising pairs of images representing identical documents and pairs of images where one of the documents in the pair results from a falsification of the other document in the pair.

In one embodiment, other global dissimilarity measurements may be used. For example, during the step 570 the dissimilarity measurement DI may be replaced by a dissimilarity measurement DJ. The dissimilarity measurement DJ is calculated as the integral of the probability distribution of the measurements of dissimilarity between the first image and the registered second image between a value $\alpha \cdot d_{max}$ and $d_{max}$, where $d_{max}$ is the maximum value of the dissimilarity measurements and a is a weighting lying in a set of values] 0.1[. For example α=0.5. In this case, the predetermined threshold S2 is adapted to the dissimilarity measurement DJ.

If the first document is identical to the second document, the processing module 300 displays a message on the display module indicating that the two documents compared are identical during a step 572. In this case, the processing module 300 considers that there has not been any falsification and the method of FIG. 4 ends.

If the processing module 300 determines that the two documents are different, it must determine at what point the two documents are different. To do this, during steps 573 to 578 the processing module 300 determines a level of difference between the first and second documents according to a value representing a proportion of pixels in the first image situated in sensitive zones belonging to a subpart, having a corresponding subpart in the second image, the dissimilarity measurement of which is above a predetermined threshold S3.

In one embodiment, the processing module 300 compares the measurement of dissimilarity of each subpart of the first image matched with a subpart of the second image with the predetermined threshold S3. The threshold S3 is determined by learning using an image base comprising pairs of images representing identical documents and pairs of images where one of the documents of the pair results from a falsification of the other document in the pair. For each pair of images in the base, a distribution of dissimilarity measurements is calculated. The threshold S3 is then determined so as to ensure good separability of the distributions of the identical image pairs and the image pairs comprising a falsified image. A classification of the ROC (receiver operating characteristic) curve can then be used to ensure this good separability.

During a step 573, the pixels of the first image (or of the second image) of the subparts having a dissimilarity measurement below the threshold S3 are considered to be identical and set to 0. The pixels of the first image (or of the second image) of the subparts having a dissimilarity measurement above or equal to the threshold S3 are considered to be different and set to 1. All the other pixels of the first (or second image) are set to a value different from 0 and 1.

In a step 574, an analysis into connected components is applied to the first image thus modified in order to aggregate in the same region pixels of said image equal to 1. The analysis into connected components makes it possible, in the first image, to obtain a set of regions, referred to as dissimilar regions, each comprising pixels having the value 1.

In steps 575 and 577, the processing module 300 calculates a dissimilarity indicator ID representing the difference level between the first and second documents. To do this, during step 575, the processing module 300 calculates the area of each dissimilar region (the area of a region can be represented by a number of pixels in the region).

The processing module 300 next calculates, during step 577, a sum $\sigma_{rd}$ of the areas of each dissimilar region and divides this sum by a sum $\sigma_{zs}$ of the areas of each sensitive zone detected in order to obtain the dissimilarity indicator ID:

$$ID = \frac{\sigma_{rd}}{\sigma_{zs}}$$

In a step 578, the processing module 300 compares the dissimilarity indicator ID with a predetermined threshold S4 in order to determine whether there has been an attempt at document fraud. The threshold S4 is determined by learning using an image base comprising pairs of images representing identical documents and pairs of images where one of the documents in the pair results from a falsification of the other document in the pair. A dissimilarity indicator ID is calculated for each pair in the image base. A histogram of the dissimilarity indicators ID is then calculated for each type of pair, each histogram representing the probability distribution of the dissimilarity indicators ID. In each histogram, each dissimilarity indicator is associated with a probability that this dissimilarity indicator will occur. For each dissimilarity indicator value ID, a probability of false alarm for the pairs of images representing identical documents, and a probability of non-detection of fraud for the pairs of images where one of the documents in the pair results from a falsification of the other document in the pair, is calculated. By means of these probabilities, a classification of the ROC curve type is used for finding a threshold value S4 making it possible to obtain good separability between the dissimilarity indicators representing a fraud and the dissimilarity indicators representing documents that are different but not resulting from a fraud.

If the dissimilarity indicator ID calculated during step 577 is less than S4, the processing module 300 decides, during a step 579, that there is an attempt at fraud and displays a message on the display module 301 indicating this attempt at fraud. Otherwise the processing module 300 decides that there has not been an attempt at fraud during a step 580 and displays a message indicating this on the display module 301.

In one embodiment, during a step 576 intermediate between steps 575 and 577, the processing module 300 eliminates each dissimilar region having a dimension smaller than a predetermined dimension A, i.e. the pixels in these regions are set to 0. For example, the predetermined dimension A is a height and the processing module 300 eliminates the dissimilar regions situated in a sensitive zone comprising text having a height less than A=10 pixels or less than A=5 pixels. This is because, below such a height, it becomes difficult to analyse a text reliably. In another example, the predetermined dimension A is an area and the processing module 300 eliminates the dissimilar regions having an area of less than A=100 pixels square Eliminating dissimilar regions having a small size makes it possible to reduce the impact of an insignificant dissimilarity due for example to a residual registration error or due to noise in the images.

In one embodiment, the area of each dissimilar region is weighted according to an importance of said dissimilar region. The sum of the areas of the dissimilar regions is therefore a weighted sum. Likewise, in this embodiment, the sum of the areas of the sensitive zones detected is a sum weighted according to the importance of each sensitive zone. For example, when a dissimilar region is situated in a sensitive zone comprising a face, the area of this region receives a first predetermined weight greater than a second predetermined weight attributed to an area of a dissimilar region lying in a sensitive zone comprising text. When the text zone detection method executed during step 531 makes it possible to differentiate the personalisable text zones from the non-personalisable text zones in a document, the area of a dissimilar region belonging to a personalisable text zone receives a third predetermined weight greater than a fourth predetermined weight attributed to an area of a dissimilar region belonging to a non-personalisable text zone.

In one embodiment, in a step 51 intermediate between step 50 and step 52, the processing module 300 applies a segmentation method to the first and second images. For example, the segmentation method makes it possible to detect quadrilaterals in an image, which is consistent with rectangular documents seen in perspective in an image. Following the application of the segmentation method, each quadrilateral found in an image is considered to form part of a document included in said image. For example, the processing module 300 applies for this purpose a segmentation method described in the document "Jung, C. R., and R. Schramm, *"Rectangle Detection based on a Windowed Hough Transform"*, Brazilian Symposium on Computer Graphics and Image Processing (*SIBGRAPI*), Curitiba, 2004" or a segmentation method described in the document "Fan, Jian, *Detection of quadrilateral document regions from digital photographs. WACV2016*". These two methods make it possible to locate the first and second documents in respectively the first and second images. Thus each processing operation performed in the remainder of the method (corresponding to steps 52, 53, 55 and 56) applies to only part of the first and second images containing respectively the first and second documents rather than to the whole of the first and second images. In this way the complexity of the method is reduced.

Other segmentation methods more suited to documents that have undergone more complex transformations may however be used.

In one embodiment, the step 53 of detecting zones sensitive to document frauds in the first image and in the registered second image is performed only in regions of the first image and of the registered second image comprising points of interest detected during step 52. For example, the processing module 300 determines in the first image (and respectively in the registered second image) a convex envelope encompassing all points of interest detected in this image. The sensitive zones are then sought in each convex envelope determined. In this way the complexity of the method is reduced.

The invention claimed is:

1. A method for detecting document fraud, wherein the method comprises:
    obtaining a first image of a first document and a second image of a second document;
    applying an image registration procedure to the second image so as to register it to the first image, the registration procedure being based on a matching of points of interest identified in the first and second images;
    applying a procedure of detection of zones sensitive to document frauds in the first image and in the registered second image;
    dividing each sensitive zone detected into a plurality of subparts and, for each subpart, calculating a signature representing a content of said subpart;
    for each subpart of the first image, seeking a subpart corresponding spatially in the registered second image and, for each subpart of the first image having a corresponding subpart in the second image, calculating a measurement of local dissimilarity between the corresponding subparts from the signatures;
    determining that the first and second documents are identical when a measurement of global dissimilarity determined from a distribution of probabilities of measurements of local dissimilarities is below a first predetermined threshold and, when the first document is different from the second document:
    determining a level of difference between the first and second documents according to a value representing a proportion of pixels in the first image situated in sensitive zones belonging to a subpart having a corresponding subpart in the second image where the measurement of dissimilarity is higher than a second predetermined threshold; and
    detecting a fraud when the level of difference is below a third predetermined threshold.

2. The method according to claim 1, wherein the registration procedure comprises:
    determining that no fraud has been detected when a value representing an efficacy of matching of points of interest between the first and second images is below a predetermined threshold.

3. Method according to claim 1, wherein the sensitive zone detection procedure comprises a procedure for detecting a face in the first image and the registered second image and/or a procedure for detecting text zones in the first image and the registered second image.

4. The method according to claim 1, wherein the measurement of global dissimilarity is such that an integral of a probability distribution of the measurements of local dissimilarity between the first image and the registered second image, said integral being calculated between the measurement of global dissimilarity and a maximum value of the measurements of local dissimilarity in said distribution, is higher than a predetermined fourth threshold, said predetermined fourth threshold being equal to a predetermined second percentage of an integral of the probability distribution of the local dissimilarity measurements.

5. The method according to claim 1, wherein, in order to determine a difference level between the first and second documents, the method comprises:
    comparing the measurement of dissimilarity of each subpart of the first image matched with a subpart of the second image with the predetermined second threshold and classifying the pixels of an image, referred to as an intermediate image, taken from the first or second images, belonging to subparts for which the dissimilarity measurement is higher than the predetermined second threshold in a class of pixels considered to be dissimilar;
    forming dissimilar pixel regions from pixels classified in the class of pixels considered to be dissimilar;
    calculating a sum of the areas of the dissimilar pixel regions and obtaining an indicator of dissimilarity representing said difference level by dividing this sum by a sum of the areas of the sensitive zones.

6. The method according to claim 5, wherein each sum is a weighted sum, each area being weighted with a predetermined weight dependent on an importance attributed to the dissimilar pixel region or to the sensitive zone corresponding to the area calculated.

7. The method according to claim 6, wherein the importance attributed to the dissimilar-pixel region or to a sensitive zone is predefined according to a type of content of the zone.

8. The method according to claim 5, wherein the dissimilar-pixel regions wherein a dimension is smaller than a predetermined dimension are not taken into account in calculating the sum of the areas of the dissimilar-pixel regions.

9. The method according to claim 1, wherein the method comprises: applying a segmentation procedure to the first and second images, said segmentation procedure making it possible to detect quadrilaterals in an image, each quadrilateral found in an image being considered to form part of the document contained in said image, the image registration procedure and the sensitive zone detection procedure being carried out in the quadrilaterals identified by the segmentation procedure.

10. The method according to claim 1, wherein the detection of zones sensitive to document frauds in the first image and in the registered second image is executed in portions of the first image and of the registered second image comprising points of interest matched.

11. The method according to claim 1, wherein each sensitive zone is a rectangle and is divided in a regular tiling, each subpart being a rectangle a length of which is a third predefined percentage of a length of the rectangle representing the sensitive zone detected in which the subpart is situated and a width of which is a predefined fourth percentage of a width of said rectangle.

12. A device for detecting a document fraud, wherein said device comprises electronic circuitry configured for:
- obtaining a first image of a first document and a second image of a second document;
- applying an image registration procedure to the second image so as to register it to the first image, the registration procedure being based on a matching of points of interest identified in the first and second images;
- applying a procedure of detection of zones sensitive to document frauds in the first image and in the registered second image;
- dividing each sensitive zone detected into a plurality of subparts and, for each subpart, calculating a signature representing a content of said subpart;
- for each subpart of the first image, seeking a subpart corresponding spatially in the registered second image and, for each subpart of the first image having a corresponding subpart in the second image, calculating a measurement of local dissimilarity between the corresponding subparts from the signatures;
- determining that the first and second documents are identical when a measurement of global dissimilarity determined from a distribution of probabilities of measurements of local dissimilarities is below a first predetermined threshold and, when the first document is different from the second document:
- determining a level of difference between the first and second documents according to a value representing a proportion of pixels in the first image situated in sensitive zones belonging to a subpart having a corresponding subpart in the second image where the measurement of dissimilarity is higher than a second predetermined threshold; and
- detecting a fraud when the level of difference is below a third predetermined threshold.

13. Computer program stored on a non-transitory computer readable medium, wherein it comprises instructions for the implementation, by a device, of the method according to claim 1, when said program is executed by a processor of said device.

14. A non-transitory computer readable storage means, wherein the storage means stores a computer program comprising instructions for the implementation, by a device, of the method according to claim 1, when said program is executed by a processor of said device.

* * * * *